United States Patent
Shin et al.

(10) Patent No.: US 11,495,794 B2
(45) Date of Patent: Nov. 8, 2022

(54) NEGATIVE ELECTRODE ACTIVE MATERIAL FOR LITHIUM SECONDARY BATTERY, NEGATIVE ELECTRODE FOR LITHIUM SECONDARY BATTERY INCLUDING THE SAME AND LITHIUM SECONDARY BATTERY INCLUDING THE SAME

(71) Applicant: LG CHEM, LTD., Seoul (KR)

(72) Inventors: Sun-Young Shin, Daejeon (KR); Je-Young Kim, Daejeon (KR); Su-Min Lee, Daejeon (KR); Yong-Ju Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 206 days.

(21) Appl. No.: 16/631,652

(22) PCT Filed: Jan. 25, 2019

(86) PCT No.: PCT/KR2019/001125
§ 371 (c)(1),
(2) Date: Jan. 16, 2020

(87) PCT Pub. No.: WO2019/147083
PCT Pub. Date: Aug. 1, 2019

(65) Prior Publication Data
US 2020/0136137 A1   Apr. 30, 2020

(30) Foreign Application Priority Data
Jan. 25, 2018 (KR) ........................ 10-2018-0009495

(51) Int. Cl.
| | |
|---|---|
| *H01M 4/485* | (2010.01) |
| *H01M 10/0525* | (2010.01) |
| *H01M 4/587* | (2010.01) |
| *H01M 4/62* | (2006.01) |
| *H01M 4/38* | (2006.01) |
| *H01M 4/02* | (2006.01) |

(52) U.S. Cl.
CPC .......... *H01M 4/485* (2013.01); *H01M 4/386* (2013.01); *H01M 4/587* (2013.01); *H01M 4/622* (2013.01);
(Continued)

(58) Field of Classification Search
None
See application file for complete search history.

(56) References Cited

U.S. PATENT DOCUMENTS

| | | | |
|---|---|---|---|
| 10,109,884 B2 | 10/2018 | Matsuno et al. | |
| 2005/0186475 A1 | 8/2005 | Jeong et al. | |

(Continued)

FOREIGN PATENT DOCUMENTS

| | | |
|---|---|---|
| CN | 101174683 A | 5/2008 |
| CN | 106165160 A | 11/2016 |

(Continued)

OTHER PUBLICATIONS

International Search Report issued in PCT/KR2019/001125 (PCT/ISA/210), dated May 13, 2019.

*Primary Examiner* — Zhongqing Wei
(74) *Attorney, Agent, or Firm* — Birch, Stewart, Kolasch & Birch, LLP

(57) ABSTRACT

A negative electrode active material for a lithium secondary battery which includes a silicon oxide-based composite represented by M-SiOx (wherein 0<x≤2, and M is Li or Mg), artificial graphite and spheroidized natural graphite; the spheroidized natural graphite is present in an amount of 5 wt % to 15 wt % based on the combined weight of the silicon oxide-based composite, artificial graphite and the spheroidized natural graphite; the spheroidized natural graphite has a tap density of 0.9 g/cc or more; and the total content of N, O and H impurities in the spheroidized natural graphite is 200 ppm to 1000 ppm based on 0.1 g of the (Continued)

spheroidized natural graphite. A lithium secondary battery including the negative electrode active material is also provided. The lithium secondary battery shows improved adhesion between the negative electrode active material layer and the current collector, and provides improved battery performance.

10 Claims, 1 Drawing Sheet

(52) U.S. Cl.
CPC .. H01M 10/0525 (2013.01); *H01M 2004/027* (2013.01)

(56) References Cited

U.S. PATENT DOCUMENTS

| | | |
|---|---|---|
| 2012/0328923 A1 | 12/2012 | Sawai et al. |
| 2014/0212750 A1 | 7/2014 | Ahn et al. |
| 2015/0194668 A1* | 7/2015 | Ueda .................... H01M 4/386 |
| | | 429/231.4 |
| 2016/0056468 A1* | 2/2016 | Miyamoto ............ H01M 4/622 |
| | | 429/162 |
| 2016/0276657 A1 | 9/2016 | Song et al. |
| 2017/0104204 A1 | 4/2017 | Zhamu et al. |
| 2018/0342757 A1* | 11/2018 | Choi .................... H01M 4/366 |

FOREIGN PATENT DOCUMENTS

| | | | |
|---|---|---|---|
| JP | 2000-90926 A | | 3/2000 |
| JP | 2015-164127 A | | 9/2015 |
| JP | 2015164127 A | * | 9/2015 |
| KR | 10-2005-0087148 A | | 8/2005 |
| KR | 10-1325555 B1 | | 11/2013 |
| KR | 10-2013-0142877 A | | 12/2013 |
| KR | 10-1608115 B1 | | 4/2016 |
| KR | 10-1685832 B1 | | 12/2016 |
| KR | 10-2017-0137000 A | | 12/2017 |
| KR | 20170137000 A | * | 12/2017 ............ H01M 4/366 |

* cited by examiner

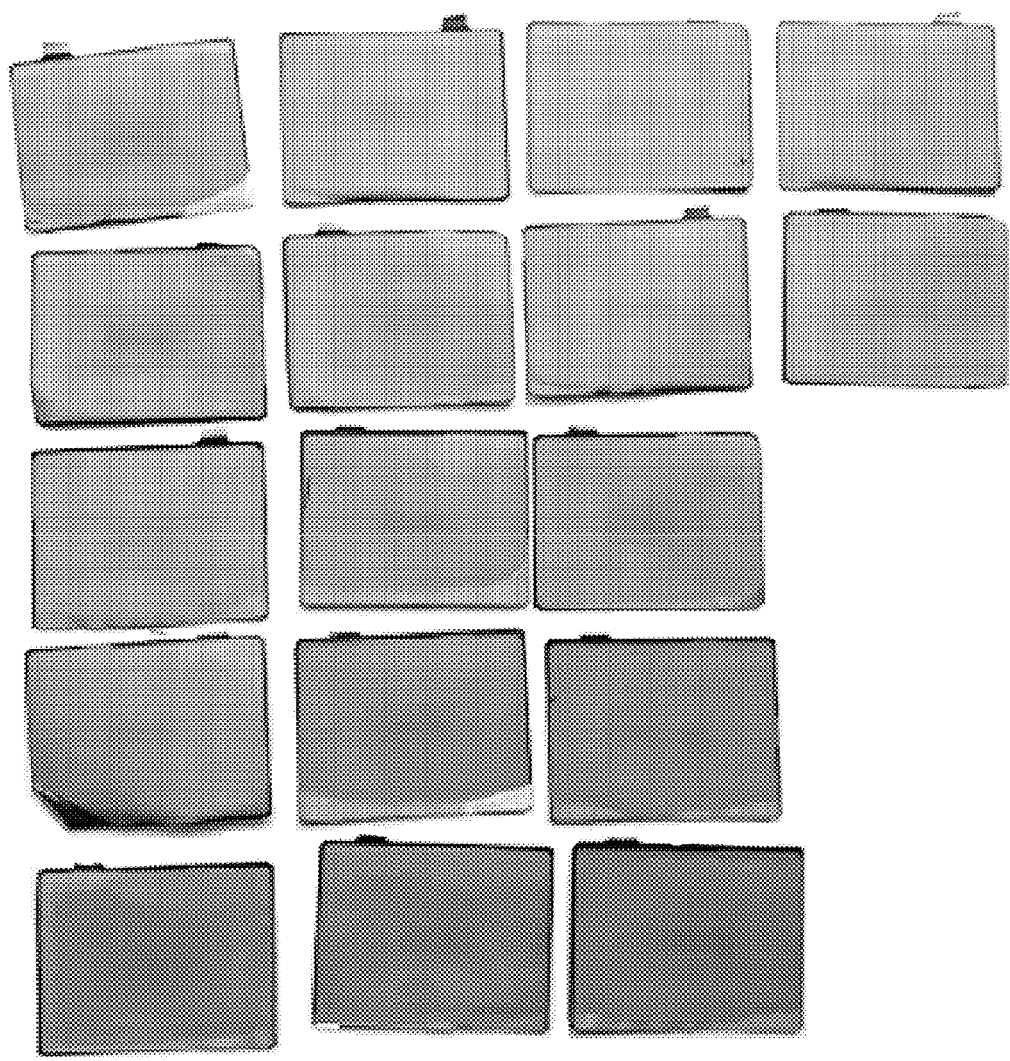

NEGATIVE ELECTRODE ACTIVE MATERIAL FOR LITHIUM SECONDARY BATTERY, NEGATIVE ELECTRODE FOR LITHIUM SECONDARY BATTERY INCLUDING THE SAME AND LITHIUM SECONDARY BATTERY INCLUDING THE SAME

TECHNICAL FIELD

The present application claims priority to Korean Patent Application No. 10-2018-0009495 filed on Jan. 25, 2018 in the Republic of Korea the entire content of which is hereby expressly incorporated by reference.

The present disclosure relates to a negative electrode active material for a lithium secondary battery, a negative electrode for a lithium secondary battery including the same, and a lithium secondary battery including the same.

BACKGROUND ART

Recently, energy storage technology has increasingly been given attention. Efforts into research and development for electrochemical devices have been actualized more frequently, as the application of energy storage technology has been extended to energy storage for cellular phones, camcorders and notebook personal computers, and even to energy storage for electric vehicles. Among such electrochemical devices, secondary batteries have been focused on the most, since they are rechargeable. Particularly, lithium secondary batteries have advantages of a high operating voltage and large energy density.

Various types of carbonaceous materials capable of lithium intercalation/deintercalation, including artificial graphite, natural graphite and hard carbon, have been used as negative electrode active materials for lithium secondary batteries. Among them, graphite has a low discharge voltage of −0.2V when compared with lithium, and thus a battery using graphite as a negative electrode active material shows a high discharge voltage of 3.6V. In addition, graphite is an excellent active material which provides an advantage in terms of energy density and has excellent reversibility. However, when graphite is used as an active material, the resultant battery shows undesirably low capacity.

To solve the above-mentioned problem, a silicon oxide-based compound is used in combination with a carbonaceous negative electrode material, such as graphite, as a negative electrode active material in the case of electric vehicles (EV), such as hybrid electric vehicles (HEV).

However, when using a silicon oxide-based compound in combination with graphite as a negative electrode active material, the silicon oxide-based compound shows a high swelling/shrinking degree during charge/discharge, which causes detachment of a negative electrode active material from a negative electrode current collector.

Artificial graphite may be used in the form of secondary particles in order to reduce swelling that occurs due to the use of artificial graphite as a negative electrode active material and to improve high-speed charge characteristics/output characteristics. However, such secondary particles of artificial graphite have the problem of degradation of adhesion between active materials or between an active material and a current collector due to their particle shapes.

DISCLOSURE

Technical Problem

The present disclosure is directed to providing a negative electrode for a lithium secondary battery which uses a silicon oxide-based composite and graphite as negative electrode active materials, and ensures a predetermined level of adhesion between a negative electrode active material layer and a negative electrode current collector.

The present disclosure is also directed to providing a lithium secondary battery including the negative electrode.

Technical Solution

According to the first embodiment of the present disclosure, there is provided a negative electrode active material for a lithium secondary battery which includes a silicon oxide-based composite represented by M-SiOx, (wherein $0<x\leq2$, and M is Li or Mg), artificial graphite and spheroidized natural graphite; wherein the spheroidized natural graphite is present in an amount of 5 wt % to 15 wt % based on a combined weight of the silicon oxide-based composite, the artificial graphite and the spheroidized natural graphite; the spheroidized natural graphite has a tap density of 0.9 g/cc or more; and the total content of N, O and H impurities in the spheroidized natural graphite is 200 ppm to 1000 ppm based on 0.1 g of the spheroidized natural graphite.

According to the second embodiment of the present disclosure, there is provided the negative electrode active material for a lithium secondary battery as defined in the first embodiment, wherein the spheroidized natural graphite is present in an amount of 7 wt % to 13 wt % based on the combined weight of the silicon oxide-based composite, the artificial graphite and the spheroidized natural graphite.

According to the third embodiment of the present disclosure, there is provided the negative electrode active material for a lithium secondary battery as defined in the first or the second embodiment, wherein the total content of N, O and H impurities in the spheroidized natural graphite is 250 ppm to 800 ppm based on 0.1 g of the spheroidized natural graphite.

According to the fourth embodiment of the present disclosure, there is provided the negative electrode active material for a lithium secondary battery as defined in any one of the first to the third embodiments, which consists of the silicon oxide-based composite, the artificial graphite and the spheroidized natural graphite.

According to the fifth embodiment of the present disclosure, there is provided the negative electrode active material for a lithium secondary battery as defined in any one of the first to the fourth embodiments, wherein the spheroidized natural graphite has a tap density of 0.9 g/cc to 1.2 g/cc.

According to the sixth embodiment of the present disclosure, there is provided the negative electrode active material for a lithium secondary battery as defined in any one of the first to the fifth embodiments, wherein the spheroidized natural graphite is present as particles, which particles have an average particle diameter ($D_{50}$) of 8 μm to 25 μm.

According to the seventh embodiment of the present disclosure, there is provided the negative electrode active material for a lithium secondary battery as defined in any one of the first to the sixth embodiments, wherein the silicon oxide-based composite is formed by assemblage of domains, and the domains includes each of: i) Si, ii) SiOx ($0<x\leq2$), or iii) M-silicate, (wherein M is Li or Mg).

According to the eighth embodiment of the present disclosure, there is provided the negative electrode active material for a lithium secondary battery as defined in any one of the first to the seventh embodiments, wherein the silicon oxide-based composite is present in an amount of 3 wt % to 15 wt % based on the combined weight of the silicon oxide-based composite, the artificial graphite and the spheroidized natural graphite.

According to the ninth embodiment of the present disclosure, there is provided a negative electrode for a lithium secondary battery which includes the negative electrode active material as defined in any one of the first to the eighth embodiments and further includes a binder polymer, wherein the binder polymer is an aqueous binder polymer.

According to the tenth embodiment of the present disclosure, there is provided a lithium secondary battery including the negative electrode as defined in the ninth embodiment.

Advantageous Effects

The negative electrode active material according to an embodiment of the present disclosure includes a silicon oxide-based composite, artificial graphite and natural graphite, with the proviso that natural graphite having a specific range of impurity content and tab density is used at a specific compositional ratio, and thus shows excellent adhesion strength between a negative electrode active material layer and a negative electrode current collector. In addition, a lithium secondary battery obtained by using the negative electrode active material shows high capacity, long life and low swelling characteristics.

DESCRIPTION OF DRAWINGS

The FIGURE is a photographic image illustrating detachment of the negative electrode active material from a negative electrode current collector, in the negative electrode according to Comparative Example 1.

BEST MODE

In one aspect of the present disclosure, there is provided a negative electrode active material for a lithium secondary battery which includes a silicon oxide-based composite represented by M-SiOx (wherein 0<x≤2, and M is Li or Mg), artificial graphite and natural graphite, wherein the natural graphite is spheroidized natural graphite; the spheroidized natural graphite is present in an amount of 5 wt % to 15 wt % based on a combined weight of the silicon oxide-based composite, the artificial graphite and the spheroidized natural graphite; wherein the spheroidized natural graphite has a tap density of 0.9 g/cc or more; and the total content of N, O and H impurities in the spheroidized natural graphite is 200 ppm to 1000 ppm based on 0.1 g of the spheroidized natural graphite.

The negative electrode active material according to the present disclosure may include a silicon oxide-based composite, artificial graphite and spheroidized natural graphite, wherein the silicon oxide-based composite, artificial graphite and spheroidized natural graphite may be incorporated in the form of a mixture. The negative electrode active material according to the present disclosure may merely include the silicon oxide-based composite, artificial graphite and spheroidized natural graphite, wherein only silicon oxide-based composite, artificial graphite and spheroidized natural graphite may be incorporated in the form of a mixture.

The spheroidized natural graphite is present in an amount of 5 wt % to 15 wt %, or 7 wt % to 13 wt %, based on the combined weight of the silicon oxide-based composite, artificial graphite and the spheroidized natural graphite in the negative electrode active material. When the content of the spheroidized natural graphite is less than 5 wt %, it is not possible to ensure a desired level of adhesion between a negative electrode active material layer and a negative electrode current collector. When the content of the spheroidized natural graphite is larger than 15 wt %, battery performance, such as capacity maintenance, may be degraded.

The spheroidized natural graphite has a tap density of 0.9 g/cc or more. Preferably, the spheroidized natural graphite has a tap density of 0.9 g/cc to 1.2 g/cc. In general, as tap density is increased, a spheroidiziation degree may be increased, packing density of an electrode may be increased, and the content of N, O and H impurities may be increased. However, when the spheroidized natural graphite has excessively high tap density, many defects may be formed in the graphite structure during a process of artificially spheroidizing scaly graphite, resulting in degradation of the life characteristics of a battery. When the spheroidized natural graphite has a tap density less than 0.9 g/cc, it is not possible to obtain an effect of improving adhesion due to such an excessively low spheroidization degree.

As used herein, 'tap density' refers to the apparent density of the powder obtained by vibrating a container under a predetermined condition when filling the container with powder. Tap density is determined by using a SEISHIN (KYT-4000) test instrument after introducing 20 g of a sample to a sample container for tap density determination and carrying out tapping 1000 times from a dropping height of 5 mm.

The spheroidized natural graphite includes N, O and H impurities and the combined weight of N, O and H impurities is 200 ppm to 1000 ppm, 250 ppm to 800 ppm, or 300 ppm to 700 ppm, wherein each of N, O and H contents is larger than 0 ppm. When the combined weight of N, O and H impurities is less than 200 ppm, the natural graphite becomes hydrophobic, which causes a decrease in the binding force with a binder polymer, particularly an aqueous binder polymer (e.g. styrene-butadiene rubber). This results in degradation of active material-active material adhesion and active material-current collector adhesion in a negative electrode. In addition, when the combined weight of N, O and H impurities is larger than 1000 ppm, side reactions with an electrolyte are increased, resulting in degradation of life characteristics of a battery.

Such N, O and H impurities are present in the natural graphite, since some defects are formed in the hexagon-shaped aligned carbon structure on graphite or on the surface C coating layer while graphite undergoes digging a raw graphite material from a mine, repeated acid-treatment processes for removing impurities, a spheroidization process for spheroidizing scaly graphite, a surface coating process with pitch and a carbonization process. Impurities, such as N, O and H, are then attached to such defect portions.

Since N, O and H impurities are present during the above-described processes, the impurities are present not only on the particle surface of natural graphite, but also inside of the particles.

The content of N, O and H impurities in the spheroidized natural graphite may be controlled by various methods. As a non-limiting example, use of spheroidized natural graphite, in general, involves a high impurity content. In addition, when the spheroidized natural graphite is coated with pitch, or the like, heat treatment is carried out for carbonization at a high temperature of 1000° C. to 1300° C. and the impurity content is decreased during the heat treatment. Further, when heat treatment is carried out artificially at about 500° C. under oxygen atmosphere, the surface of natural graphite may be oxidized to cause an increase in impurity content. As the carbonization temperature is increased, the content of N, O and H impurities is reduced. When the carbonization temperature is low or no carbonization is carried out, the content of N, O and H impurities may be increased excessively.

As used herein, the combined weight of N, O and H impurities is determined by introducing 0.1 g of a natural graphite sample to be tested to a crucible, and introducing the crucible to an ONH analyzer to determine the weight (concentration). Therefore, as used herein, 'the combined weight of N, O and H impurities in natural graphite (provided in a ppm unit)' is based on 0.1 g of 'natural graphite', unless otherwise stated.

The spheroidized natural graphite particles may have an average particle diameter ($D_{50}$) of 8 μm to 25 μm, preferably 10 μm to 20 μm, in the form of secondary particles. When the average particle diameter ($D_{50}$) of natural graphite particles in the form of secondary particles is less than 8 μm, the content of thickener/binder polymer, such as carboxymethyl cellulose/styrene-butadiene rubber, is increased, thereby making it undesirably difficult to carry out electrode coating. In this case, side reactions between the spheroidized natural graphite particles and an electrolyte are increased, resulting in the undesirable degradation of life/storage characteristics. When the average particle diameter is larger than 25 μm, the spheroidized natural graphite particles may cause blocking of a filter upon slurry coating, or the like.

In addition, the spheroidized natural graphite particles have a BET specific surface area of 1 $m^2/g$ to 10 $m^2/g$, preferably 2 $m^2/g$ to 5 $m^2/g$. Within the range of 1 $m^2/g$ to 10 $m^2/g$, it is possible to ensure a large contact area with an electrolyte without using an excessive amount of binder polymer, to facilitate lithium intercalation/deintercalation, and to reduce the reactance of a battery.

Herein, the BET specific surface area is determined by a general method of metering adsorption and desorption of nitrogen gas per unit weight. As a test instrument, NOVA-1200 (trademark) may be used.

The silicon oxide-based composite that may be used according to the present disclosure may be represented by M-SiOx (wherein $0<x\leq2$, and M is Li or Mg). More particularly, M-SiOx is in the form of a composite formed by assemblage of nano-sized domains, and each of the domains includes: i) Si, ii) SiOx ($0<x\leq2$), or iii) M-silicate (wherein M is Li or Mg). Herein, x may be 1, but is not limited thereto. The amount of element M is not particularly limited, as long as it does not significantly inhibit the effect of silicon. For example, element M may be present in an amount of 1 mole or less per mole of silicon atoms present in the silicon oxide-based composite. Herein, M-silicate may be doped to SiOx or may be bound to SiOx.

The silicon oxide-based composite may be crystalline or amorphous. According to an embodiment of the present disclosure, the silicon oxide may include a plurality of silicon phases including crystalline silicon alone. Particularly, the silicon phases may be distributed homogeneously and embedded/buried in a matrix including the silicon oxide-based composite. In other words, the silicon phases may be dispersed and homogeneously distributed in the matrix. The silicon phase is a group formed by the assembly of one or more silicon crystals, and a single group may be present or two or more groups may be present.

The silicon oxide-based composite may have a carbon coating layer on the surface thereof, and the carbon coating layer may be bound to, attached to, or coated on the surface of the silicon oxide material. Meanwhile, according to an embodiment of the present disclosure, the coating layer has a thickness of 10 nm to 150 nm. Within the above-defined range, the upper limit of the coating layer thickness may be 100 nm, 80 nm, 70 nm or 50 nm, and the lower limit thereof may be 15 nm, 25 nm, 35 nm or 50 nm.

The secondary particles of silicon oxide-based composite including a carbon coating layer may have an average particle diameter ($D_{50}$) of 0.5 μm to 10 μm, or 1 μm to 6 μm. When the average particle diameter ($D_{50}$) of the silicon oxide-based composite is smaller than 0.5 μm, the negative electrode active material layer may have decreased density and additional oxidization is increased to cause a decrease in capacity. When the average particle diameter is larger than 10 μm, the rate characteristics may be degraded or degradation of life characteristics may occur due to volumetric swelling.

As used herein, 'average particle diameter ($D_{50}$)' means the value determined as weight average value $D_{50}$ (particle diameter when the accumulated weight becomes 50% of the total weight) in the particle size distribution determined by laser beam diffractometry.

The carbon coating layer may include amorphous or crystalline carbon. For example, the carbon coating layer may be present in the form of hard carbon formed by pyrolyzation of various organic materials, such as a phenolic resin or furan resin, or in the form of soft carbon formed by carbonization of coke, needle coke, coal tar pitch or petroleum pitch. In addition, the carbon coating layer may be formed through chemical vapor deposition (CVD) by supplying a carbon-supplying compound, such as methane.

The silicon oxide-based composite may be present in an amount of 3 wt % to 15 wt % or 3 wt % to 10 wt % based on the combined weight of the silicon oxide-based composite, the artificial graphite and the spheroidized natural graphite. When the content of the silicon oxide-based composite is smaller than 3 wt %, it is difficult to provide a battery with high capacity. When the content of the silicon oxide-based composite is larger than 10 wt %, adhesion between the active material and the current collector may be decreased due to repeated swelling/shrinking of silicon oxide-based composite particles.

Although the shape of the silicon oxide-based composite is not particularly limited, it may have a spherical or elliptical shape but is not limited thereto.

According to an embodiment of the present disclosure, $SiO_x$ ($0<x\leq2$) is unreactive with Li and causes no Li intercalation/deintercalation during the charge of a battery. Although Si forms a composite with Li to contribute to charge/discharge of a battery, it has a problem of a severe change in volume during charge/discharge. To solve the problem, a negative electrode material using microcrystalline Si or a composite of Si with $SiO_2$ has been developed. However, $SiO_2$ forms $LiO_2$ or Li—S—O during the initial charge to generate irreversible capacity undesirably. Thus, the present disclosure has paid attention to reducing generation of such initial irreversible capacity by incorporating a metal element having binding force equal to or higher than the binding force of Li to a silicon oxide-based composite. According to an embodiment of the present disclosure, the metal (M) is Mg or Li, preferably Mg. In addition, the silicon oxide-based composite includes magnesium silicate (Mg-silicate), wherein the Mg-silicate includes at least one of $MgSiO_3$ and $Mg_2SiO_4$. In the silicon oxide-based composite, metal silicate and silicon oxide are present in such a state that the elements of each phase are diffused so that the boundary surface of one phase is bound to that of another phase (i.e., the phases are bound to each other in an atomic level), and thus undergo minimal change in volume during lithium ion intercalation/deintercalation and cause no cracking of silicon oxide-based composite particles even after repeating charge/discharge.

In addition, according to an embodiment of the present disclosure, the metal (M) may be present in an amount of 4 wt % to 20 wt %, 4 wt % to 16 wt %, or 4 wt % to 10 wt % based on 100 wt % of the silicon oxide-based composite. When the metal (M) content satisfies the range of 4 wt % to 20 wt %, it is possible to improve efficiency while minimizing a decrease in capacity.

According to still another embodiment of the present disclosure, Si crystallite may have a size of 1 nm to 15 nm in the silicon oxide-based composite. When the Si crystal size, i.e. crystallite size is larger than the above-defined range, life characteristics may be degraded.

Meanwhile, it is preferred that SiOx (0<x≤2) may be micronized so that the crystallinity may not be observed through X-ray diffractometry (XRD).

The artificial graphite that may be used according to the present disclosure may be artificial graphite used conventionally in the art. For example, such artificial graphite may be in the form of scaly particles. In addition, the artificial graphite may have an average particle diameter ($D_{50}$) of 1 µm to 50 µm, 5 µm to 35 µm, or 10 µm to 25 µm. When the average particle diameter of artificial graphite particles is smaller than 1 µm, it is not easy to pulverize artificial graphite into a desired size and a larger amount of energy is required. When the average particle diameter is larger than 50 µm, it takes a long time to diffuse lithium to the negative electrode active material layer, resulting in degradation of charge/discharge rate.

According to the present disclosure, artificial graphite may form the balance amount of negative electrode active material, except the silicon oxide composite and spheroidized natural graphite.

The artificial graphite particles may have a BET specific surface area of 0.4 $m^2$/g to 5 $m^2$/g, or 0.5 $m^2$/g to 3.5 $m^2$/g. Within the above-defined range of 0.4 $m^2$/g to 5 $m^2$/g, it is possible to ensure a large contact area with an electrolyte without using an excessive amount of binder polymer, to facilitate lithium intercalation/deintercalation, and to reduce the reactance of a battery.

The artificial graphite particles may have an apparent density (tapping 0 time) of 0.7 g/$cm^3$ or more, and may have a tap density of 0.8 g/$cm^3$ to 1.6 g/$cm^3$.

The silicon oxide-based composite, natural graphite and artificial graphite are used for the negative electrode active material according to an embodiment of the present disclosure, and are dispersed in a solvent, such as an organic solvent or water, together with a conductive material and a binder polymer at the above-defined compositional ratio to form negative electrode mixture slurry. Then, the slurry is coated onto at least one surface of a negative electrode current collector, followed by pressing and drying, to obtain a negative electrode.

The binder polymer is used to bind active material particles and to retain a shaped product. Non-limiting examples of the binder polymer include polytetrafluoroethylene (PTFE), polyvinylidene fluoride (PVdF), styrene butadiene rubber (SBR). Such binders are classified into a solvent-based binder (i.e., binder using an organic solvent as a solvent), such as polyvinylidene fluoride (PVdF), and an aqueous binder (i.e. binder using water as a solvent), such as styrene-butadiene rubber (SBR). The aqueous binder is economical and eco-friendly and is not harmful to the worker's health, unlike the solvent-based binder. In addition, the aqueous binder has a higher binding effect as compared to the solvent-based binder, and thus can increase the ratio of active material per the same volume to provide high capacity. Preferably, the aqueous binder is SBR. As widely known in the art, such an aqueous binder may be dispersed in water together with a thickening agent such as carboxymethyl cellulose (CMC) so that it may be applied to an electrode. The binder polymer may be used in an amount of 0.7 parts to 3 parts by weight based on 100 parts by weight of the total solid content used for the electrode active material slurry. Particularly, in the case of a negative electrode using an aqueous binder and a thickening agent, the combined weight of the binder and thickening agent may be 1.5 parts to 5 parts by weight based on 100 parts by weight of the total solid content used for the electrode active material slurry.

There is no particular limitation in the conductive material, as long as it causes no chemical change in an electrochemical device. In general, particular examples of the conductive material include acetylene black, carbon black, denka black, graphite, carbon fibers, carbon nanotubes, metal powder, conductive metal oxide, organic conductive material, or the like.

The solvent used for forming an electrode may include an organic solvent, such as N-methyl pyrrolidone (NMP), dimethyl formamide (DMF), acetone or dimethyl acetamide, or water. The solvents may be used alone or in combination. However, when forming negative electrode slurry, water is used preferably as a solvent. It is preferred that the solvent is used in such an amount that the electrode active material, binder and conductive material may be dissolved and dispersed therein, considering the coating thickness of slurry and production yield.

The negative electrode forms an electrode assembly together with a positive electrode including a positive electrode active material and a separator, and the electrode assembly and an electrolyte are received in a casing to provide a lithium secondary battery.

The positive electrode active material may be selected from a layered compound such as lithium cobalt oxide ($LiCoO_2$) or lithium nickel oxide ($LiNiO_2$), or a compound substituted with one or more transition metals; a lithium manganese oxide represented by the chemical formula of $Li_{1+y}Mn_{2-y}O_4$ (wherein y is 0-0.33), $LiMnO_3$, $LiMn_2O_3$ or $LiMnO_2$; a lithium copper oxide ($Li_2CuO_2$); a vanadium oxide such as $LiV_3O_8$, $LiV_3O_4$, $V_2O_5$ or $Cu_2V_2O_7$; a Ni-site type lithium nickel oxide represented by the chemical formula of $LiNi_{1-y}M_yO_2$ (wherein M is Co, Mn, Al, Cu, Fe, Mg, B or Ga, and y is 0.01-0.3); a ternary lithium manganese composite oxide represented by the chemical formula of $LiMn_{2-y}M_yO_2$ (wherein M=Co, Ni, Fe, Cr, Zn or Ta, and y is 0.01-0.1) or $Li_2Mn_3MO_8$ (wherein M=Fe, Co, Ni, Cu or Zn); $LiMn_2O_4$ in which Li is partially substituted with an alkaline earth metal ion; a disulfide compound; $Fe_2(MoO_4)_3$; ternary lithium transition metal composite oxide represented by the chemical formula of $Li(Ni_aCo_bMn_c)O_2$ (0<a<1, 0<b<1, 0<c<1, a+b+c=1); or the like, but is not limited thereto.

The positive electrode active material may be dispersed in an organic solvent together with a binder polymer, conductive material and other additives to form a positive electrode mixture slurry, and the slurry may be coated onto at least one surface of a positive electrode current collector, followed by drying and pressing, to form a positive electrode.

Non-limiting examples of the positive electrode current collector include foil made of aluminum, nickel or a combination thereof, and those of the negative electrode current collector include foil made of copper, gold, nickel, copper alloy or a combination thereof.

The binder polymer, conductive material and other additives used for the positive electrode may be the same as or different from those used for the negative electrode as described above The electrolyte includes conventional electrolyte ingredients, such as an electrolyte salt and an organic solvent. The electrolyte salt that may be used is a salt having a structure of $A^+B^-$, wherein $A^+$ includes an alkali metal cation such as $Li^+$, $Na^+$, $K^+$ or a combination thereof and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof. Particularly, a lithium salt is preferred. For example, $LiClO_4$, $LiCF_3SO_3$, $LiPF_6$, $LiAsF_6$, $LiN(CF_3SO_2)_2$ or a combination thereof may be used.

The organic solvent used in combination with the electrolyte may include a currently known solvent, such as a cyclic carbonate solvent; liner carbonate solvent; ester solvent; nitrile solvent; phosphate solvent; or a combination thereof, wherein the solvent may include a halogen substituent or not. For example, the organic solvent that may be used includes propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (GBL), fluoroethylene carbonate (FEC), methyl formate, ethyl formate, propyl formate, methyl acetate, ethyl acetate, propyl acetate, pentyl acetate, methyl propionate, ethyl propionate, propyl propionate, butyl propionate or a combination thereof.

The lithium secondary battery according to an embodiment of the present disclosure may be provided in the form of a cylindrical, prismatic, pouch-type or coin-type battery, but its outer shape or casing is not limited thereto.

The lithium secondary battery according to an embodiment of the present disclosure may include any conventional lithium secondary batteries, such as a lithium metal secondary battery, lithium ion secondary battery, lithium polymer secondary battery or a lithium ion polymer secondary battery.

MODE FOR DISCLOSURE

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

In one chamber, $Si/SiO_2$ were mixed at 1:1 and the mixture of $Si/SiO_2$ was allowed to evaporate in a gaseous state at 1400° C. In another chamber, Mg is also allowed to evaporate in a gaseous state at 750° C. Then, the mixture $Si/SiO_2$ and Mg were allowed to react with each other in a gaseous state, and then cooled to perform precipitation in a bulk state on a plate. The precipitated bulk-state material was pulverized finely through a milling process to a size of $D_{50}=5$ μm. The pulverized material was introduced to a tubular furnace and methane gas was introduced thereto under an argon gas atmosphere to carry out carbon coating through chemical vapor deposition (CVD), thereby providing 5 wt % of carbon-coated Mg—SiOx (0<x≤2). The resultant silicon oxide-based composite represented by Mg—SiOx (0<x≤2) included: i) Si, ii) $SiO_x$ (x<0≤2), and iii) Mg-silicate, each in the form of a nano-sized domain, as determined by analyzing induced coupled plasma-atomic emission spectrometry (ICP-AES) and X-ray diffractometry (CuKα). More particularly, the silicon oxide-based composite had a matrix structure wherein Si domains were surrounded with silicon dioxide ($SiO_2$) domains and magnesium silicate domains, more particularly $MgSiO_3$ and $Mg_2SiO_4$ domains.

Petroleum coke was pulverized to a diameter ($D_{50}$) of 7 μm and graphitized at 3,000° C. Then, the petroleum coke was mixed with a pitch binder and formed into secondary particles. After that, carbonization was carried out at 1,100° C. under nitrogen ($N_2$) atmosphere to obtain artificial graphite having a diameter ($D_{50}$) of 16.1 μm in the form of secondary particles.

Meanwhile, scaly natural graphite, as a raw material, was subjected to a spheroidization process, coated with pitch, carbonized at 1,100° C. and pulverized into a diameter ($D_{50}$) of 16.5 μm. In this manner, spheroidized natural graphite having a tap density of 0.95 g/cc was prepared, wherein the total content of N, O and H impurities was 451 ppm based on 0.1 g of spheroidized natural graphite.

The silicon oxide-based composite represented by Mg—SiOx (0<x≤2), artificial graphite and the spheroidized natural graphite were mixed at a weight ratio of 5:85:10, respectively, to prepare a negative electrode active material for a lithium secondary battery. Therefore, the content of spheroidized natural graphite was 10 wt % based on the combined weight of the silicon oxide-based composite, artificial graphite and the spheroidized natural graphite, and the content of silicon oxide-based composite was 5 wt % based on the combined weight of the silicon oxide-based composite, artificial graphite and the spheroidized natural graphite.

The resultant negative electrode active material including Super-C (trade mark) as a conductive material, carboxymethyl cellulose (CMC) as a thickening agent and styrene-butadiene rubber (SBR) as a binder polymer were introduced to water at a weight ratio of 95:1:1:3 (Super-C (trade mark) as a conductive material:carboxymethyl cellulose (CMC) as a thickening agent:styrene-butadiene rubber (SBR) as a binder polymer) to prepare negative electrode slurry. The negative electrode slurry was coated on copper foil and cut into an area of 1.4875 cm², followed by pressing and drying, to obtain a negative electrode.

In addition, the negative electrode and lithium metal as a counter electrode were used to form an electrode assembly with a polypropylene separator interposed between both electrodes. A non-aqueous electrolyte was prepared by adding 1M $LiPF_6$ to an organic solvent obtained by mixing ethylene carbonate with ethylmethyl carbonate at a volume ratio of 3:7 and adding vinylene carbonate thereto at a concentration of 1 wt %. Then, the non-aqueous electrolyte was injected to the electrode assembly to obtain a coin-type secondary half-cell (CHC).

Comparative Example 1

A negative electrode was obtained in the same manner as Example 1, except that the silicon oxide-based composite, artificial graphite and the spheroidized natural graphite were used at a weight ratio of 5:95:0.

Comparative Example 2

A negative electrode was obtained in the same manner as Example 1, except that the silicon oxide-based composite, artificial graphite and the spheroidized natural graphite were used at a weight ratio of 5:75:20.

Comparative Example 3

A negative electrode was obtained in the same manner as Example 1, except that spheroidized natural graphite having a tap density of 0.7 g/cc and a total content of N, O and H impurities of 1986 ppm based on 0.1 g of spheroidized natural graphite was used.

Comparative Example 4

A negative electrode was obtained in the same manner as Example 1, except that spheroidized natural graphite having a tap density of 0.69 g/cc and a total content of N, O and H impurities of 416 ppm based on 0.1 g of spheroidized natural graphite was used.

Comparative Example 5

A negative electrode was obtained in the same manner as Example 1, except that spheroidized natural graphite having a tap density of 1.0 g/cc and a total content of N, O and H impurities of 161 ppm based on 0.1 g of spheroidized natural graphite was used.

Comparative Example 6

A negative electrode was obtained in the same manner as Example 1, except that spheroidized natural graphite having a tap density of 1.01 g/cc and a total content of N, O and H impurities of 1148 ppm based on 0.1 g of spheroidized natural graphite was used.

Test Example 1: Adhesion and Capacity Maintenance

To evaluate adhesion, a double-sided tape was attached onto slide glass and each of the negative electrodes according to Example 1 and Comparative Examples 1-6 was cut into a size of 1 cm×12 cm and attached thereto, so that the negative electrode active material layer might be disposed on the slide glass. Then, a peel test machine was used to carry out 180° peel-off so that the negative electrode active material layer might be peeled off from the slide glass at a rate of 30 cm/min, and the force at that time was determined.

In addition, to evaluate capacity maintenance, each of the lithium secondary batteries according to Example 1 and Comparative Examples 1-6 was charged/discharged twice at 0.1C/0.1C and subjected to charge/discharge cycles 50 times at 0.5C/0.5C, and then capacity maintenance (%) was determined.

The results are shown in the following Table 1.

TABLE 1

| | Negative electrode active material Silicon composite:artificial graphite:spheroidized natural graphite (wt %) | Tap density of spheroidized natural graphite (g/cc) | Total content of N, O and H impurities of natural graphite (ppm) | Adhesion of negative electrode (gf/cm) | Capacity maintenance after 50 cycles (%) |
|---|---|---|---|---|---|
| Ex. 1 | 5:85:10 | 0.95 | 451 | 21 | 94.1 |
| Comp. Ex. 1 | 5:95:0 | None | None | 11 | 94.9 |
| Comp. Ex. 2 | 5:75:20 | 0.95 | 451 | 26 | 85.3 |
| Comp. Ex. 3 | 5:85:10 | 0.7 | 1986 | 16 | 81.6 |
| Comp. Ex. 4 | 5:85:10 | 0.69 | 416 | 13 | 87.8 |
| Comp. Ex. 5 | 5:85:10 | 1.0 | 161 | 15 | 91.6 |
| Comp. Ex. 6 | 5:85:10 | 1.01 | 1148 | 22 | 83.1 |

It can be seen from the above results that Example 1 according to the present disclosure shows excellent adhesion of negative electrode and capacity maintenance after 50 cycles.

On the contrary, the lithium secondary battery according to Comparative Example 1 shows excellent life characteristics, but has a problem of poor adhesion between the negative electrode active material layer and the negative electrode current collector, since it uses no natural graphite. Such low adhesion may become more problematic in the case of mass production as compared to manufacture of a small amount of electrodes at a laboratory level. This is because coating/drying of electrode active material slurry may be performed rapidly in the case of mass production, and thus detachment of the electrode active material from the electrode current collector may become more serious. In Comparative Example 1, the electrode active material is detached from the electrode current collector, particularly from the edge of the electrode current collector, due to low adhesion, and thus the electrode current collector is exposed. This is shown in the FIGURE.

The negative electrode according to Comparative Example 2 shows the highest adhesion but the lithium secondary battery using the negative electrode shows poor life characteristics.

In Comparative Example 3, which uses spheroidized natural graphite having low tap density, both the adhesion of negative electrode and the capacity maintenance are poor. In Comparative Example 4, both the adhesion of the negative electrode and the capacity maintenance are poor. Comparative Example 5 shows poor adhesion of negative electrode and Comparative Example 6 shows poor capacity maintenance.

What is claimed is:

1. A negative electrode active material for a lithium secondary battery comprising:
   a composite formed by assemblage of domains, and the domains comprise each of i) Si, ii) $SiO_x$, wherein $0<x\leq2$, and iii) a silicate of formula M-SiOx, wherein M is Li or Mg;

artificial graphite; and spheroidized natural graphite, wherein the spheroidized natural graphite is present in an amount of 5 wt % to 15 wt % based on a combined weight of the composite, the artificial graphite and the spheroidized natural graphite, the spheroidized natural graphite has a tap density of 0.9 g/cc or more, and a total content of N, O and H impurities in the spheroidized natural graphite is 200 ppm to 1000 ppm based on 0.1 g of the spheroidized natural graphite.

2. The negative electrode active material for the lithium secondary battery according to claim 1, wherein the spheroidized natural graphite is present in an amount of 7 wt % to 13 wt % based on the combined weight of the composite, the artificial graphite and the spheroidized natural graphite.

3. The negative electrode active material for the lithium secondary battery according to claim 1, wherein the total content of N, O and H impurities in the spheroidized natural graphite is 250 ppm to 800 ppm based on 0.1 g of the spheroidized natural graphite.

4. The negative electrode active material for the lithium secondary battery according to claim 1, consisting of the composite, the artificial graphite and the spheroidized natural graphite.

5. The negative electrode active material for the lithium secondary battery according to claim 1, wherein the spheroidized natural graphite has a tap density of 0.9 g/cc to 1.2 g/cc.

6. The negative electrode active material for the lithium secondary battery according to claim 1, wherein the spheroidized natural graphite is present as particles, which particles have an average particle diameter $D_{50}$ of 8 μm to 25 μm.

7. The negative electrode active material for the lithium secondary battery according to claim 1, wherein the composite is present in an amount of 3 wt % to 15 wt % based on the combined weight of the composite, the artificial graphite and the spheroidized natural graphite.

8. A negative electrode for a lithium secondary battery comprising the negative electrode active material as defined in claim 1; and a binder polymer, wherein the binder polymer is an aqueous binder polymer.

9. A lithium secondary battery comprising the negative electrode as defined in claim 8.

10. The negative electrode active material for the lithium secondary battery according to claim 1, wherein a carbon coating layer is present on a surface of the composite.

* * * * *